United States Patent [19]

Noe

[11] 4,193,315
[45] Mar. 18, 1980

[54] BELT DRIVE SYSTEM UTILIZING AN ADJUSTABLE IDLER MECHANISM

[75] Inventor: William J. Noe, Newton, Iowa

[73] Assignee: The Maytag Company, Newton, Iowa

[21] Appl. No.: 875,301

[22] Filed: Feb. 6, 1978

[51] Int. Cl.² ............................................. F16H 7/12
[52] U.S. Cl. ........................... 74/242.11 R; 74/227; 68/23.7; 56/11.6
[58] Field of Search ...... 74/242.8, 242.1 R, 242.11 R, 74/226, 227; 200/61.13, 61.18; 335/189, 190; 56/16.7, 11.6; 68/23.6, 23.7

[56] References Cited

U.S. PATENT DOCUMENTS

| | | | |
|---|---|---|---|
| 3,242,657 | 3/1966 | Larsen et al. | 56/11.6 |
| 3,358,521 | 12/1967 | Browning | 74/226 |
| 3,374,686 | 3/1968 | Brewer | 74/242.11 R |
| 3,525,241 | 8/1970 | Morton | 74/227 |
| 3,978,693 | 9/1976 | Worst | 68/23.7 |

*Primary Examiner*—C. J. Husar
*Assistant Examiner*—David C. Reichard
*Attorney, Agent, or Firm*—Richard L. Ward

[57] ABSTRACT

An adjustable idler mechanism for use with a belt drive system in a laundry appliance. The idler mechanism includes first and second bell cranks pivoted about a common point and interconnected by a threaded member for adjustment with respect to each other to place tension on the drive belt. A solenoid is provided to disengage the idler mechanism from the drive belt during predetermined portions of a cycle of operations.

13 Claims, 3 Drawing Figures

4,193,315

BELT DRIVE SYSTEM UTILIZING AN ADJUSTABLE IDLER MECHANISM

BACKGROUND OF THE INVENTION

1. Field of the Invention

This invention relates generally to belt idler systems and more particularly to an idler mechanism which is adjustable over a particular range for providing proper belt tension to a belt drive.

2. Description of the Prior Art

Prior art belt drive systems indicate a constant search for methods of varying belt tension to obtain the proper driving tension in the face of several problems including tolerances in belt length, tolerance in manufactured parts and in the center-to-center distance between driving and driven members.

Morton, in U.S. Pat. No. 3,525,241 for example, provides for pulley tension adjustment by moving the attachment hook of a biasing spring from one location to another on an adjustment link.

Foster, in U.S. Pat. No. 3,965,768, also adjusts the pulley tension by moving a biasing spring. Foster provides a tool which may be used to determine when the tension is proper.

While these patents show methods of providing for varying and/or obtaining proper belt tension, a need still exists for a system having improved adjustment over a definite range as shown in the adjustable idler mechanism of the instant invention.

SUMMARY OF THE INVENTION

It is therefore an object of this invention to provide an improved belt drive system.

It is a further object of the instant invention to provide a unique adjustable idler mechanism to insure proper belt tension in a belt drive system.

It is a still further object of the instant invention to provide in a belt drive system a compound idler mechanism having first and second bell crank members which are pivoted with respect to each other and which are adjustable with respect to each other.

The instant invention achieves these objects in a drive system having a drive motor, a driven member, and drive apparatus including a drive belt for connecting the drive motor and the driven member. An idler mechanism is operable for effecting a driving connection of the drive apparatus with the drive motor and the driven member and includes a pair of members pivotally movable with respect to each other. One of the idler members includes an idler pulley engageable with the drive belt. An adjustable connection joins the idler members and is operable for positioning the idler pulley juxtaposed to the drive belt for engagement therewith. A spring is provided for biasing the idler mechanism into operative engagement with the drive belt to apply driving tension thereto.

Operation of the device and further objects and advantages thereof will become evident as the description proceeds and from an examination of the accompanying two sheets of drawings.

BRIEF DESCRIPTION OF THE DRAWINGS

The drawings illustrate a preferred embodiment of the invention with similar numerals referring to similar parts throughout the several views, wherein:

FIG. 3 is an enlarged sectional view through the pivot taken generally along lines 3—3 of FIG. 1.

DESCRIPTION OF A PREFERRED EMBODIMENT

Figure 1:
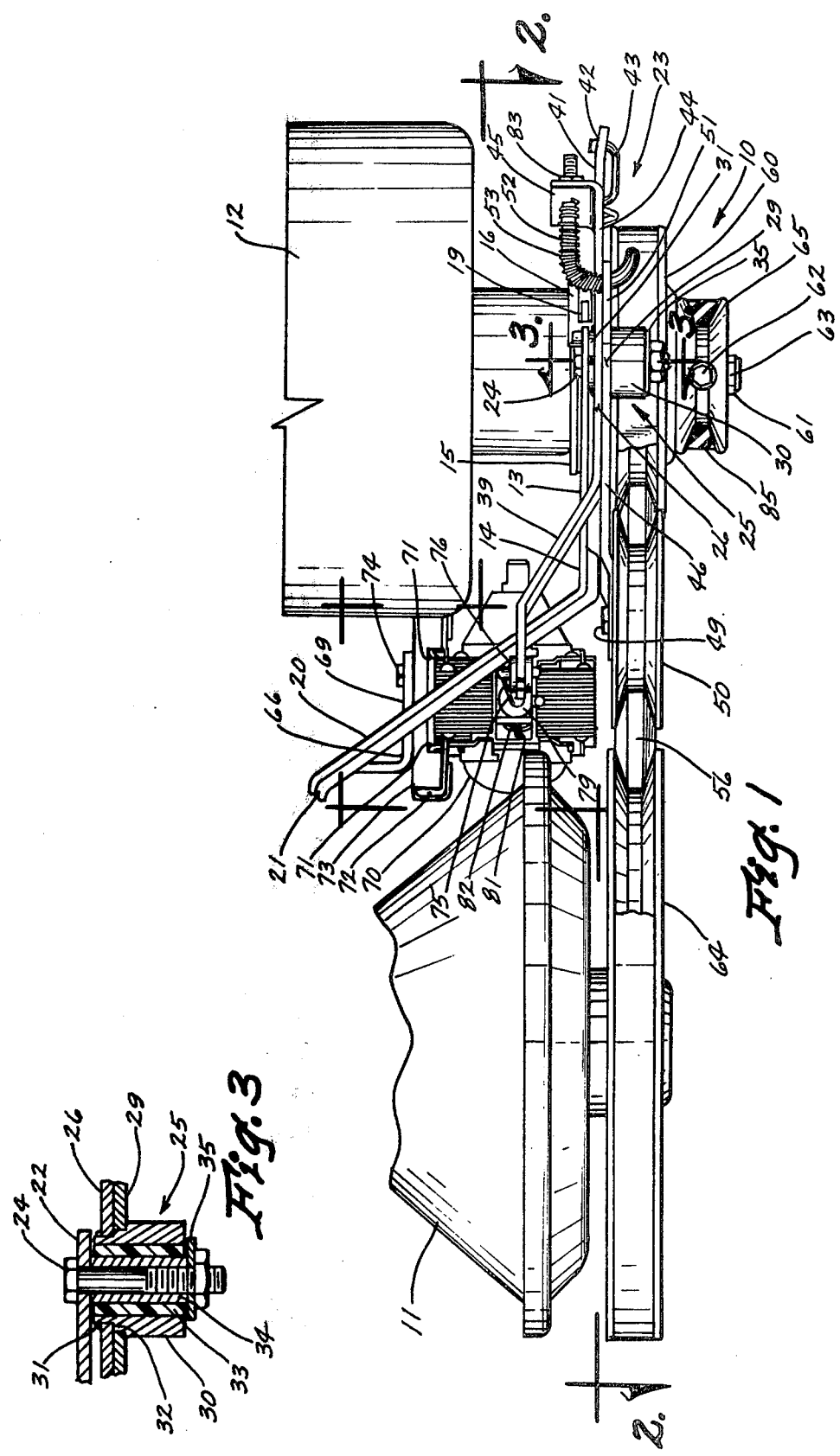
FIG. 1 is an elevation view of a belt drive system for a laundry machine.

Referring now to the drawings there is shown a belt drive system 10 for a laundry appliance. This belt drive system 10 may be adapted to drive an automatic washing machine through a drive assembly 11 as shown in U.S. Pat. Nos. 2,948,372 and 3,013,645 dated Aug. 9, 1960 and Dec. 19, 1961. These patents, issued to John D. Goodlaxson, are assigned to the assignee of the instant invention and incorporated herein by reference.

Figure 2:
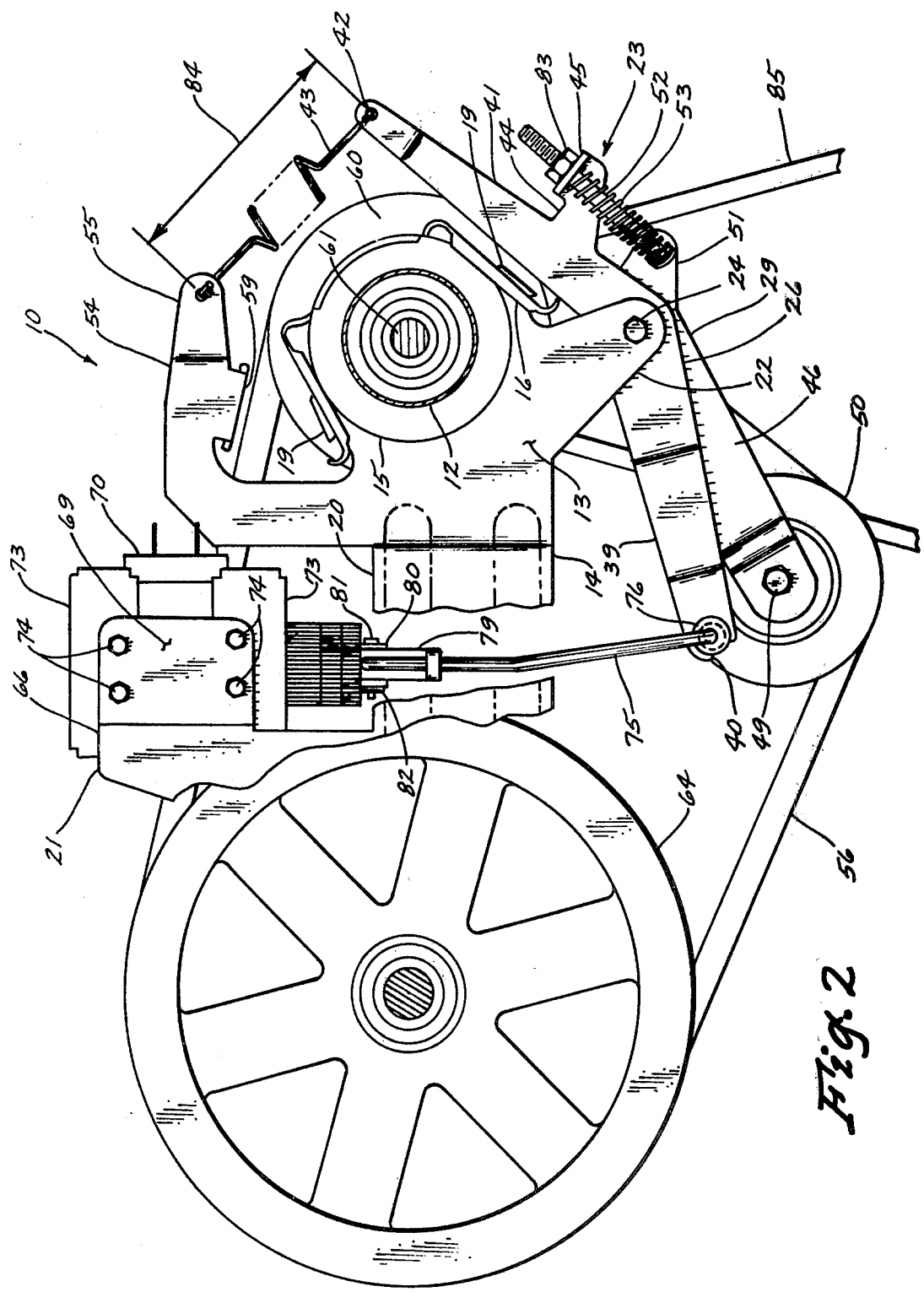
FIG. 2 is a plane view of the belt drive system taken generally along lines 2—2 of FIG. 1.

As shown in FIGS. 1 and 2, a bidirectional electric drive motor 12 is secured to the lower level 13 of a multilevel mounting bracket 14. At the lower end of the drive motor 12 a resilient ring 15 is disposed between the mounting bracket 14 and the drive motor 12. The drive motor 12 is then secured to the mounting bracket 14 by means of a spring retaining clip 16 as best shown in FIG. 2 which snaps over and is retained by a pair of formed ears 19 in the mounting bracket 14. The upper end of the drive motor 12, though not shown, is likewise resiliently supported.

The mounting bracket 14 further includes, as best shown in FIG. 1, an arm 20 which extends angularly upward and to the left. The upper level 21 of the mounting bracket 14 is rigidly secured to the interior chassis of the washing machine by suitable threaded fasteners (not shown) and in combination with the resilient ring 15 and spring retaining clip 16 thus serves to anchor the lower end of the drive motor 12 to the washing machine.

On the same lower level 13 as the drive motor 12 lower end mounting location the mounting bracket 14 further includes an outwardly extending projection 22, as shown in FIG. 2. An idler mechanism 23 is pivotally mounted on this projection 22 by a bolt 24 which extends downwardly through the mounting bracket 14 and through the mounting portion 25 of the idler mechanism as shown in FIG. 3. This idler mechanism 23 consists primarily of first and second bell crank members 26 and 29 which are joined at the common pivot or mounting point by a stepped cylindrical hub 30 as shown in FIGS. 1 and 3 and which passes through the second and first bell crank members 26 and 29 respectively. A portion 31 of the cylindrical hub 30 protrudes upwardly through the first bell crank 26 and is clinched to the top of the first bell crank 26 to form a permanent assembly as shown in FIG. 3. The second bell crank 29 will pivot with respect to the first bell crank 26 and the cylindrical hub 30 because of clearance between the first and second bell cranks 26 and 29 in the shouldered area 32 of the cylindrical hub 30.

FIG. 3 shows a bearing 33, formed of a thermoplastic material, pressed into the cylindrical hub 30 of the idler mechanism 23. A steel sleeve 34 is located inside the thermoplastic bearing 33. The thermoplastic bearing 33 is slightly longer than the cylindrical hub 30 of the idler arm mechanism 23 and in turn the innermost steel sleeve 34 is slightly longer than the thermoplastic bearing 33. When the bolt 24 is tightened to secure the idler mechanism 23 to the mounting bracket 14, the steel sleeve 34 will be captured between the mounting bracket projection 22 and the flat washer 35 and the idler arm mechanism 23 will be free to pivot on the thermoplastic bearing 33.

As shown in FIGS. 1 and 2, the arms of the first and second bell cranks 26 and 29 of the idler mechanism 23 extend radially outward from the fixed pivot point. The first bell crank 26 has an arm or extension 39 which extends upwardly and to the left and has a slot 40 formed in the end of the arm or extension 39 as shown in FIGS. 1 and 2. The first bell crank 26 also has an arm or extension 41 which extends to the right in FIGS. 1 and 2 to form an attachment point 42 for one end of a biasing spring 43. The right arm or extension 41 of the first bell crank 26 also includes, at substantially its midpoint and at generally right angles to the bell crank 26, an outwardly extending shoulder 44 having an upturned tab 45 with a clearance hole punched in its center.

Referring again to FIGS. 1 and 2, the second bell crank 29 is located below the first bell crank 26 and its main body 46 extends to the left from the fixed pivot or mounting point. The extremity of this main body 46 has a clearance hole through which a suitable threaded fastener 49 is inserted for mounting an idler pulley 50 to the second bell crank 29. The opposite end of the second bell crank 29 includes a lug 51 which projects angularly outward from the pivot or mounting point and includes a through hole.

Turning once again to FIGS. 1 and 2, a J-shaped rod 52 having its straight end threaded is shown interconnecting the first and second bell cranks 26 and 29. The curved end of the J-shaped rod 52 is inserted into the through hole of the lug 51 of the second bell crank 29 from above and is free to pivot relative to the lug 51. The threaded end of the rod 52 extends through the clearance hole in the upturned tab 45 of the shoulder 44 on the first bell crank 26. A compression spring 53 is placed over the J-shaped rod 52 between the first and second bell cranks 26 and 29 to tension the two bell cranks 26 and 29 with respect to each other and to prevent rattling of the idler mechanism 23 due to vibration particularly when the drive system 10 is in the idler disengaged portion of the cycle of operations.

As best shown in FIG. 2 and located diametrically opposite from the fixed pivot point relative to the motor 12 axis is a second outwardly extending projection 54 on the mounting bracket 14. The end 55 of this projection 54 serves as a second attachment point for the biasing spring 43. This spring 43 biases the right extension 41 of the first bell crank 26 in a counter-clockwise direction as viewed in FIG. 2. The shoulder 44 of the right extension 41 of the first bell crank 26 is connected to the lug 51 of the second bell crank 29 through the previously mentioned J-shaped rod 52. The biasing spring 43 is thus operable for urging the idler pulley 50 toward the drive belt 56 and for maintaining tension between the drive belt 56 and the idler pulley 50 during operation of the washing machine. Also incorporated into this second projection 54 is a belt guide 59. The belt guide 59 consists of a bent down ear having radiused ends and is located adjacent the drive belt 56 in the general area of the drive pulley 60.

The motor driven pulley 60 is operatively connected through the drive belt 56 to the pulley 64 of the drive assembly 11. The shaft 61 of the electric drive motor 12 as shown in FIG. 1 mounts the drive pulley 60 through a setscrew 62 which engages with a flat portion 63 of the shaft 61. The drive belt 56 extends from the drive pulley 60 around the idler pulley 50, to the driven pulley 64 and back to the drive pulley 60 as shown in FIG. 2. A smaller second pulley 65 associated with the drive pulley 60 on the drive motor shaft 61 is utilized for directly driving a pump (not shown) which is operable for draining the tub of the washing machine prior to a spin operation.

As further shown in FIGS. 1 and 2, the upwardly extending arm 20 of the mounting bracket 14 includes, at an intermediate level 66, a horizontal ledge 69 projecting to the right. An electrical solenoid 70 is resiliently mounted to the underside of the ledge 69. The solenoid 70 includes mounting legs 71 which in assembly are surrounded by rubber isolation pads 72. The combination of solenoid 70 and isolation pads 72 are inserted into two retainer brackets 73. The assembly of solenoid 70, isolation pads 72 and retainer brackets 73 is secured to the underside of the mounting bracket ledge 69 by a plurality of self-tapping threaded fasteners 74.

As FIG. 2 shows, an operating wire 75 extends from the solenoid 70 to the left extension 39 of the first bell crank 26. This operating wire 75 has a hook formed on each end with one end connected to the left extension 39 of the first bell crank 26 through a spool-shaped rubber member 76 which slips over the hook and then into the slot 40 in the left extension 39 of the first bell crank 26. The hook of the opposite end of the operating wire 75 is captured within a rubber retainer 79 which fits between the mounting jaws 80 of the solenoid 70 and is secured between the solenoid mounting jaws 80 by a pin 81 which extends through the combination of solenoid mounting jaws 80 and the rubber retainer 79. The pin 81 is retained by a sheet metal push-on fastener 82.

A long time problem in belt drive systems has been that of maintaining sufficient belt tension for operation in spite of tolerances in belt lengths and in the center-to-center distance between the driving member and the driven member. Also, a belt drive system which utilizes an electrical solenoid 70 to disengage the idler mechanism 23 during portions of a cycle is particularly sensitive to these tolerances in belt length and center-to-center distances as they can effect operation of the electrical solenoid 70. Since an electrical solenoid 70 has a range of plunger travel within which the holding power is greatest, it can be readily seen that manufacturing and assembly tolerances can quickly build up which would place the solenoid 70 out of its operating range. In the instant invention these tolerances are compensated for, without altering the setting of the solenoid, by providing for adjustment of the second bell crank 29 with respect to the first bell crank 26 by means of the threaded J-shaped rod 52. Although in the particular embodiment of the invention shown, the J-shaped rod 52 is utilized for interconnecting the bell cranks 26 and 29 it is contemplated that a number of mechanical equivalents may be substituted for the J-shaped rod 52 to accomplish adjustment between the bell cranks 26 and 29.

Referring to FIG. 2, when the washing machine is initially assembled, the previously mentioned tolerances are compensated for by adjusting the idler mechanism 23. This adjustment is accomplished by rotating the self-locking nut 83 against the upturned tab 45 of the shoulder 44 on the first bell crank 26. Initial tightening of the self-locking nut 83 pivots the second bell crank 29 about the pivot point while the first bell crank 26 remains stationary. This pivotal movement of the second bell crank 29 moves the idler pulley 50 towards and into contact with the drive belt 56 to take up slack in the drive belt 56.

When the idler pulley 50 has been adjusted tightly against the drive belt 56, further tightening of the self-locking nut will pivot the first bell crank 26 to stretch the biasing spring 43 toward a predetermined dimension 84, in a particular embodiment, which will correspond to a predetermined throw of the solenoid and which will produce a predetermined acceleration wattage. The acceleration wattage is that wattage required to accelerate an empty tub, through the drive belt 56, with substantially no unbalance, to a spin speed of 360-400 revolutions per minute. During this acceleration of the tub to spin speed the drive belt 56 slips in a controlled manner with respect to drive pulley 60 while maintaining substantial driving contact for driving the pulley 64. In a specific example of the preferred embodiment, for a preset dimension of 3-17/32 +or −1/16, the acceleration wattage will fall in the range of 580-620 watts and the time required to accelerate to spin speed will be from 16 to 25 seconds.

If the drive belt 56 should lose its preset tension after installation of the washing machine in a home the service technician can readjust the idler mechanism 23 by one of two ways: He can either check the wattage in acceleration to spin speed and adjust the idler mechanism 23 until this wattage is in the proper range or he can check the time required to come to full spin speed and adjust the idler mechanism 23 until this time falls into the proper range.

During operation of the laundry appliance with the electric drive motor 12 rotating in a clockwise direction for agitation as viewed in FIG. 2, the idler pulley 50 will be maintained against the drive belt 56 to tension the drive belt 56. When the drive motor 12 is reversed for pump out and spin, the electrical solenoid 70 is concurrently actuated to overcome the tension of the biasing spring 43 to pivot the first bell crank 26 and the second bell crank 29 in a clockwise direction. This pivotal action is transmitted through the spring 53 and the J-shaped rod 52 which interconnects the bell cranks 26 and 29 and pulls the idler pulley 50 away from the drive belt 56. With the idler mechanism 23 disengaged from the drive belt 56 only the pump is driven through the pump drive belt 85 to effect removal of the washing fluid from the laundry appliance tub prior to spinning for facilitating acceleration to spin speed. When the solenoid 70 is energized to totally disengage the idler pulley 50 from the drive belt 56, the belt guide 59 serves to maintain the drive belt 56 in close proximity to the drive pulley 60 and assures slipping without driving between the drive belt 56 and the drive pulley 60 so that only the pump is driven. After a predetermined period of drain time the solenoid 70 is deactivated and the idler mechanism 23 engages the drive belt 56 once again. As the drive motor 12 rotates in the counterclockwise direction during acceleration for spin, the idler mechanism 23 will be pulled inward by the idler side or tight side of the drive belt 56 thus loosening the drive belt 56 to allow controlled slippage of the motor pulley 60 against the drive belt 56 for continued driving of the pulley 64 to provide acceleration of the tub to spin speed.

It is therefore seen that the instant invention provides a unique idler arm mechanism which is adjustable within a defined range to compensate for a variety of manufacturing tolerances. By the use of this idler arm mechanism drive belt tension is maintained and solenoid travel remains substantially constant.

In the drawings and specifications there has been set forth a preferred embodiment of the invention and although specific terms are employed these are used in a generic and descriptive sense only and not for purposes of limitation. Changes in form and proportion of parts, as well as the substitution of equivalents, are contemplated, as circumstances may suggest or render expedient, without departing from the spirit or scope of this invention as defined in the following claims.

I claim:

1. A drive system comprising: a motor; a driven member; drive means including a drive belt for connecting said motor and said driven member; a pair of idler members pivotally movable with respect to each other, one of said idler members including an idler pulley engageable with said drive belt; adjustable means connecting said idler members and including an adjustment member which is operable for automatically providing a positive displacement between said idler members to initially preposition said idler pulley for nominal engagement with said drive belt; and spring means operably associated with the assembly of said pair of idler means for biasing said idler pulley into driving engagement with said drive belt, said adjustment member further operable for automatically providing additional positive displacement between said idler members to achieve said driving engagement whereby driving torque may be transmitted from said motor to said driven member.

2. A drive system as defined in claim 1 wherein said pair of idler members include first and second bell crank members for connectably supporting said adjustable means and wherein said spring means is connected to said first bell crank member and said idler pulley is supported on said second bell crank member.

3. A drive system as defined in claim 2 wherein said adjustment member comprises a threaded member operable for pivotally moving said second bell crank member with respect to said first bell crank member to move said idler pulley into said initial nominal engagement with said drive belt and to effect said additional positive displacement.

4. A drive system comprising: a motor; a driven member; drive means including a drive belt for connecting said motor and said driven member; a pair of idler members pivotally movable with respect to each other, one of said idler members including an idler pulley engageable with said drive belt; adjustable means for connecting said idler members; and spring means connected to said other idler member for biasing said connected idler members to effect driving engagement of said idler pulley with said drive belt, said adjustable means including an adjustment member which is operable for automatically providing a positive displacement between said idler members to position said idler pulley in driving engagement with said drive belt under the biasing of said spring means in a posture of substantially predetermined initial operating length whereby driving torque may be transmitted from said motor to said driven member.

5. A belt drive system as defined in claim 4 wherein said adjustment member comprises a threaded member for manually adjusting the displacement between said idler members.

6. A drive system comprising: a motor; a driven member; drive means including a drive belt for connecting said motor and said driven member; idler means operable for effecting a driving connection of said drive means with said motor and said driven member and including a pair of members pivotally movable with respect to each other, one of said idler members including an idler pulley engageable with said drive belt, said idler means further including adjustable means connecting said idler members and including an adjustment member which is operable for automatically providing a positive displacement between said idler members to initially preposition said idler pulley for nominal engagement with said drive belt; spring means connected to said other idler member for biasing said other idler member and, through said adjustable connecting means, for biasing said idler pulley into driving engagement with said drive belt, said adjustment member further operable for automatically providing additional positive displacement between said idler members for urging said idler pulley into said driving engagement; and idler disengaging means connected to said other idler member and operating against said biasing means for moving said other idler member and, through said adjustable connecting means, for moving said idler pulley out of driving engagement with said drive belt.

7. A belt drive system as defined in claim 6 wherein said idler disengaging means includes an electrical solenoid linked to said idler means and operable for moving said idler pulley out of said driving engagement with said drive belt and wherein said adjustment member is operable for effecting relative displacement of said idler members to maintain a predetermined biasing of said idler pulley and a constant throw of said solenoid.

8. A belt drive system for an apparatus comprising: a drive motor; a driven member; drive means including a drive belt for connecting said drive motor and said driven member; idler means operable for effecting a driving connection of said drive means with said drive motor and said driven member and including a pair of members pivotally movable with respect to each other about a common mounting point with one of said idler members including an idler pulley for engaging with said drive belt, said idler means further including an adjustable member interconnecting said idler members and which is operable for automatically providing a positive displacement of said one idler member with respect to the other idler member to initially preposition said idler pulley into nominal engagement with said drive belt; spring means operably connected to the assembly of said pair of idler members for biasing said idler pulley into driving engagement with said drive belt for transmitting driving torque from said drive motor to said driven member, said adjustable member further operable for automatically providing additional positive displacement between said idler members for urging said idler pulley into said driving engagement with said drive belt; and idler disengaging means operable for moving said idler pulley out of driving engagement with said drive belt.

9. A belt drive system as defined in claim 8 wherein said adjustable member is threaded and wherein said pair of members include first and second bell crank members with said bell crank members adjustable with respect to each other over a predetermined range by said threaded adjustable member.

10. A belt drive system for an automatic washing machine operable through a cycle of operations, the combination comprising: a drive motor; a driven member; drive means including a drive belt for connecting said drive motor and said driven member; idler means operable for effecting a driving connection of said drive means with said drive motor and said driven member and including first and second bell crank members pivotally movable with respect to each other about a common mounting point, said second bell crank member including an idler pulley for engaging with said drive belt, said idler means further including adjustable means having a threaded member interconnecting said first and second bell crank members and operable for automatically providing a positive displacement of said second bell crank member with respect to said first bell crank member to initially preposition said idler pulley into nominal engagement with said drive belt; spring means operably connected to the assembly of said bell crank members for biasing said idler pulley into driving engagement with said drive belt for transmitting driving torque from said drive motor to said driven member, said threaded member further operable for automatically providing additional positive displacement between said bell crank members for urging said idler pulley into said driving engagement with said drive belt; and idler disengaging means including an electrical solenoid operable for moving said idler pulley out of driving engagement with said drive belt during at least one preselected portion of said cycle of operations.

11. A belt drive system as defined in claim 10 wherein said electrical solenoid is attached through linkage means to said first bell crank member for effecting said movement of said idler means about said mounting point through said adjustable means and wherein said threaded member is operable for effecting relative displacement of said bell crank members to achieve a predetermined biasing of said idler pulley and a constant throw of said solenoid.

12. A belt drive system as defined in claim 10 wherein said spring means attaches to one end of said first bell crank member and through said interconnecting adjustable means urges said idler pulley toward said drive belt.

13. A belt drive system as defined in claim 10 wherein initial advancing of a nut on said threaded member brings said idler pulley into contact with said drive belt and further advancing of said nut urges said idler pulley into engagement with said drive belt with increasing force.

* * * * *